United States Patent
Kim et al.

(10) Patent No.: US 11,036,472 B2
(45) Date of Patent: Jun. 15, 2021

(54) RANDOM NUMBER GENERATOR GENERATING RANDOM NUMBER BY USING AT LEAST TWO ALGORITHMS, AND SECURITY DEVICE COMPRISING THE RANDOM NUMBER GENERATOR

(71) Applicant: SAMSUNG ELECTRONICS CO., LTD., Suwon-si (KR)

(72) Inventors: Sung-Kyoung Kim, Hwaseong-si (KR); Joong-Chul Yoon, Seoul (KR); Seung-Won Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/182,897

(22) Filed: Nov. 7, 2018

(65) Prior Publication Data

US 2019/0138275 A1    May 9, 2019

(30) Foreign Application Priority Data

Nov. 8, 2017 (KR) .................. 10-2017-0148331
Aug. 6, 2018 (KR) .................. 10-2018-0091295

(51) Int. Cl.
*H04L 9/06* (2006.01)
*G06F 7/58* (2006.01)
*H04L 9/14* (2006.01)

(52) U.S. Cl.
CPC .............. *G06F 7/588* (2013.01); *G06F 7/58* (2013.01); *H04L 9/0631* (2013.01); *H04L 9/0643* (2013.01); *H04L 9/0662* (2013.01); *H04L 9/14* (2013.01); *H04L 2209/08* (2013.01); *H04L 2209/12* (2013.01)

(58) Field of Classification Search
CPC ....... H04L 9/14; H04L 9/0643; H04L 9/0662; H04L 9/0631; H04L 2209/12; H04L 2209/08; G06F 7/588; G06F 7/58
See application file for complete search history.

(56) References Cited

U.S. PATENT DOCUMENTS

| | | | |
|---|---|---|---|
| 6,393,447 B1 * | 5/2002 | Jakobsson | G06F 7/58 708/250 |
| 6,598,162 B1 | 7/2003 | Moskowitz | |
| 7,007,050 B2 | 2/2006 | Saarinen | |
| 7,453,492 B2 * | 11/2008 | Silverbrook | B41J 2/14314 348/207.2 |
| 8,260,722 B2 | 9/2012 | Peart et al. | |
| 8,391,489 B2 * | 3/2013 | Paksoy | G06F 21/78 380/262 |

(Continued)

*Primary Examiner* — Mohammad A Siddiqi
(74) *Attorney, Agent, or Firm* — Volentine, Whitt & Francos, PLLC

(57) ABSTRACT

A random number generator generates a random number by using at least two algorithms. A security device includes the random number generator. The random number generator includes a random seed generator and a post processor. The random seed generator is configured to receive an entropy signal and to generate a random seed of a digital region generated by using the entropy signal. The post processor is configured to generate a random number from the random seed by using a first algorithm and a second algorithm. A bias property represents unbiasedness of a result value, and a bias property of the first algorithm is different from a bias property of the second algorithm.

16 Claims, 13 Drawing Sheets

(56) References Cited

U.S. PATENT DOCUMENTS

| | | |
|---|---|---|
| 9,189,201 B2 | 11/2015 | Jacobson et al. |
| 9,727,310 B2 | 8/2017 | Margetts |
| 2004/0086117 A1 | 5/2004 | Petersen et al. |
| 2004/0162864 A1 | 8/2004 | Nowshadi et al. |
| 2004/0205095 A1* | 10/2004 | Gressel .................. G06F 7/582 708/253 |
| 2005/0177561 A1* | 8/2005 | Ramanathan ......... G06F 16/903 |
| 2010/0070549 A1 | 3/2010 | Nagaraj |
| 2011/0075840 A1* | 3/2011 | Zayas .................. H04L 9/0662 380/46 |
| 2015/0095648 A1* | 4/2015 | Nix ........................ H04L 9/085 713/170 |
| 2016/0028544 A1* | 1/2016 | Hyde .................. G06F 3/0637 380/44 |
| 2016/0328211 A1* | 11/2016 | Nordholt ................ G06F 7/588 |

\* cited by examiner

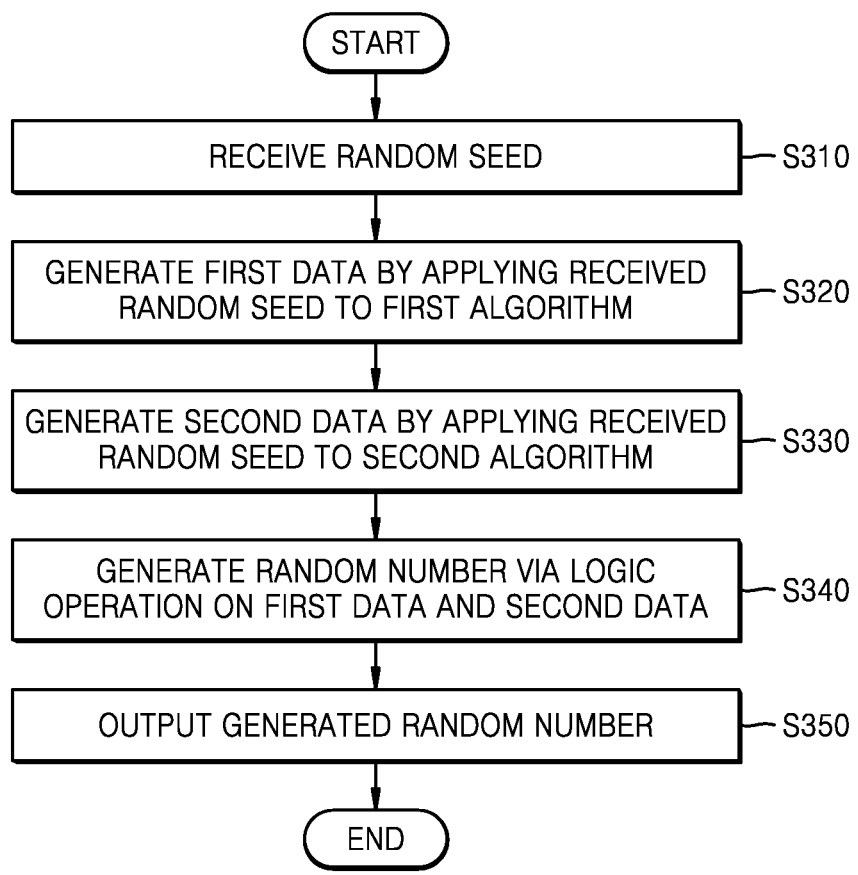

RANDOM NUMBER GENERATOR GENERATING RANDOM NUMBER BY USING AT LEAST TWO ALGORITHMS, AND SECURITY DEVICE COMPRISING THE RANDOM NUMBER GENERATOR

CROSS-REFERENCE TO RELATED APPLICATIONS

This U.S. non-provisional patent application claims priority under 35 U.S.C. § 119 to Korean Patent Application No. 10-2017-0148331, filed on Nov. 8, 2017 in the Korean Intellectual Property Office, and to Korean Patent Application No. 10-2018-0091295, filed on Aug. 6, 2018 in the Korean Intellectual Property Office, the disclosures of which are incorporated herein in their entireties by reference.

BACKGROUND

1. Technical Field

The present disclosure relates to a random number generator and a security device including the random number generator. More particularly, the present disclosure relates to a random number generator for generating a random number by using at least two algorithms, and a security device including the random number generator.

2. Description of Related Art

In general, an encrypted key is used to protect personal information of a user in data communication and the like using a smart card. A random number is needed to generate this encrypted key. Such random numbers may be typically classified into a pseudo random number and a physical random number.

A pseudo random number is artificially generated using a logic circuit and software, and thus, can be obtained using a Rivest-Shamir-Adelman (RSA) method, an elliptic curve cryptosystem, or the like.

A physical random number is generated using a physical phenomenon in the natural world. Examples of this physical phenomenon may include thermal noise of a resistor, short noise of a PN junction of a semiconductor, short noise due to photon generation, and radiation generation. The physical random number is referred to as a true random number, because it is truly unpredictable.

A random number may undergo post processing to increase randomness. A random number obtained via this post processing should satisfy unpredictability, unbiasedness, and independence.

SUMMARY

According to an aspect of the present disclosure, a random number generator is provided for generating a random number that satisfies unbiasedness by using at least two algorithms. A security device is provided that includes the random number generator.

According to an aspect of the present disclosure, a random number generator includes a random seed generator and a post processor. The random seed generator is configured to receive an entropy signal and to generate a random seed of a digital region generated by using the entropy signal. The post processor is configured to generate a random number from the random seed by using a first algorithm and a second algorithm. A bias property represents unbiasedness of a result value, and a bias property of the first algorithm is different from a bias property of the second algorithm.

According to another aspect of the present disclosure, a security device includes an entropy source, a random seed generator, and a post processor. The entropy source is configured to generate an entropy signal by using randomness. The random seed generator is configured to receive the entropy signal and to generate a digital random seed generated by using the entropy signal. The post processor is configured to generate a random number from the digital random seed by using a first algorithm and a second algorithm. The first algorithm may be or include a symmetric-key encryption algorithm, and the second algorithm may be or include a hash function algorithm.

According to another aspect of the present disclosure, a random number generator includes a random seed generator and a post processor. A random number generating method performed by the random number generator includes receiving, by the random seed generator, an entropy signal from an entropy source. The random number generating method also includes generating, by the random seed generator, a random seed of a digital region by using the entropy signal, and generating, by the post processor, a random number from the random seed by using a first algorithm and a second algorithm. A bias property represents unbiasedness of a result value, and a bias property of the first algorithm is different from a bias property of the second algorithm.

BRIEF DESCRIPTION OF THE DRAWINGS

Embodiments of the present disclosure will be more clearly understood from the following detailed description taken in conjunction with the accompanying drawings in which:

FIG. 7 is a flowchart illustrating an operation of a post processor, according to an embodiment of the present disclosure;

DETAILED DESCRIPTION OF THE EMBODIMENTS

Figure 1:
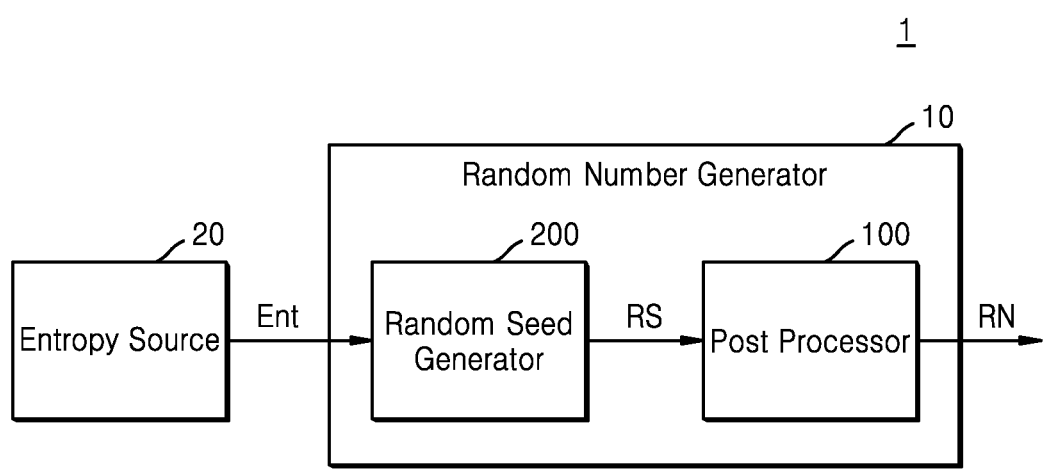
FIG. 1 is a block diagram illustrating a security device according to an embodiment of the present disclosure.

FIG. 1 is a block diagram illustrating a security device 1 according to an embodiment of the present disclosure.

Referring to FIG. 1, the security device 1 may include a random number generator 10 and an entropy source 20, and the random number generator 10 may include a random seed generator 200 and a post processor 100. The entropy source 20 may generate an entropy signal Ent and output the generated entropy signal Ent to the random seed generator 200. The entropy source 20 may generate the entropy signal Ent, based on randomness. For example, the entropy signal Ent may refer to an analog electrical signal that is generated due to a movement of a user, thermal noise of a resistor, short noise of a PN junction of a semiconductor, short noise due to photon generation, and radiation generation. According to an embodiment, the entropy source 20 may generate an entropy signal Ent that stochastically changes in a metastable state. This will be described in detail later with reference to FIGS. 13A through 13H.

In FIGs. herein including FIG. 1, circuitry may be shown as, for example, an "entropy source", a "random seed generator", a "random seed collector", a "random number generator", a "controller", an "adjuster", or a "bias checker". As is traditional in the field of the inventive concept(s) described herein, examples may be described and illustrated in terms of blocks which carry out a described function or functions. These blocks, which may be referred to herein as an entropy source, a random seed generator, a random seed collector, a random number generator, a controller, an adjuster, a bias checker, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the inventive concepts. Likewise, the blocks of the examples may be physically combined into more complex blocks without departing from the scope of the inventive concepts.

Additionally, a processor as the term is used herein is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A processor is an article of manufacture and/or a machine component. A processor described herein (e.g., including any post processor, algorithm processor, hash function processor, or other processor) may be configured to execute software instructions to perform functions as described in the various embodiments herein. A processor described herein may be a general-purpose processor or may be part of an application specific integrated circuit (ASIC). A processor described herein may also be a microprocessor, a microcomputer, a processor chip, a controller, a microcontroller, a digital signal processor (DSP), a state machine, or a programmable logic device. A processor described herein may also be a logical circuit, including a programmable gate array (PGA) such as a field programmable gate array (FPGA), or another type of circuit that includes discrete gate and/or transistor logic. A processor described herein may be a central processing unit (CPU), a graphics processing unit (GPU), or both. Additionally, a processor described herein may include multiple processors, parallel processors, or both.

The random seed generator 200 may generate a random seed RS of a digital region, based on the entropy signal Ent received from the entropy source 20. According to an embodiment, the random seed generator 200 may generate the random seed RS by amplifying the entropy signal Ent and sampling the entropy signal Ent after the entropy signal Ent is amplified. The random seed generator 200 will be described in detail with reference to FIGS. 14 through 15B.

The post processor 100 may generate a random number RN by performing post processing on the received random seed RS. According to an embodiment of the present disclosure, the post processor 100 may generate the random number RN from the random seed RS by using at least two algorithms. According to an embodiment, the at least two algorithms may be algorithms having different bias properties.

Herein, a bias property may mean a positional bias of '1' or '0' of a random number RN generated by applying the random seed RS to an algorithm. There may be several testing methods (for example, a D-Monomial test) of quantifying unbiasedness based on a bias property. The post processor 100 according to the present disclosure may generate a random number RN of which unbiasedness evaluated according to the aforementioned test methods has been increased, by applying the random seed RS to multiple algorithms having different bias properties.

Figure 2:
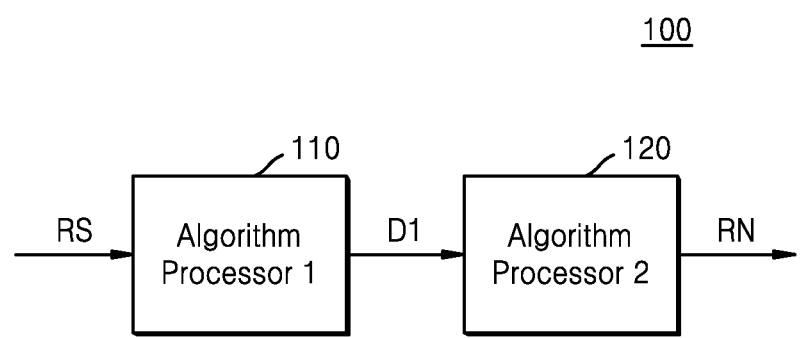
FIG. 2 is a block diagram illustrating a post processor according to an embodiment of the present disclosure.

FIG. 2 is a block diagram illustrating the post processor 100 according to an embodiment of the present disclosure.

Referring to FIGS. 1 and 2, the post processor 100 may include a first algorithm processor 110 and a second algorithm processor 120. The first algorithm processor 110 may generate first data D1 by applying the random seed RS received from the random seed generator 200 to a first algorithm, and the second algorithm processor 120 may generate the random number RN by applying the first data D1 received from the first algorithm processor 110 to a second algorithm. The first algorithm and the second algorithm are encryption algorithms and may each be one of an asymmetric-key encryption algorithm, a symmetric-key encryption algorithm (or a block encryption algorithm), and a hash function algorithm. Additionally, a first algorithm and a second algorithm are not to be interpreted as subroutines or subprocesses of single known type of encryption algorithm. For example, a first algorithm and a second algorithm may be differentiated in ways, including:

being storable in physically separated storages being entirely executable by physically separate processors being separately functional to fully encrypt data.

The asymmetric-key encryption algorithm includes a public key that is made public and a private key that is personally used. Because the asymmetric-key encryption algorithm manages the public key and the private key independently, key management is easy and encryption and user authentication are simultaneously performed. The asymmetric-key encryption algorithm may be referred to as a public key cryptosystem. The asymmetric-key encryption algorithm may be used in digital signing and non-repudiation of an electronic document. According to the asymmetric-key encryption algorithm, each user has two keys, and thus, may need to maintain a public key and a private key, which is a key pair. The asymmetric-key encryption algorithm may include a Rivest Shamir Adleman (RSA) method, an elliptic curve cryptosystem (ECC), and the like.

The symmetric-key encryption algorithm is an algorithm that performs encryption and decryption by using a single private key, and thus, only persons directly involved in secret communication may need to safely share a key. Accordingly, the symmetric-key encryption algorithm may be referred to as a secret key cryptosystem. The symmetric-key encryption algorithm may include a data encryption standard (DES) algorithm, a triple DES algorithm, an advanced encryption standard (AES) algorithm, and the like.

The hash function algorithm is a function that receives a message having an arbitrary length and outputs a hash value of a fixed length. Accordingly, the hash function algorithm does not use any keys, and thus, the same output may be always output for the same input. The hash function algorithm may provide integrity capable of detecting an error or modulation of an input message by extracting an evidence value that is unchangeable with respect to the input message. The hash function algorithm may include Cyclical Redundancy Check 32 (CRC32), message digest algorithm 5 (md5), Secure Hash Algorithm-1 (SHA-1), Secure Hash Algorithm-256 (SHA-256), Race Integrity Primitives Evaluation Message Digest-128 (RIPEMD-128), Tiger, and the like.

Bias properties of the asymmetric-key encryption algorithm, the symmetric-key encryption algorithm, and the hash function algorithm may be different from each other. According to an embodiment, a category of the first algorithm may be different than a category of the second algorithm. For example, the first algorithm may be a symmetric-key encryption algorithm, and the second algorithm may be a hash function algorithm. For example, the first algorithm may be an asymmetric-key encryption algorithm, and the second algorithm may be a hash function algorithm. For example, the first algorithm may be a symmetric-key encryption algorithm, and the second algorithm may be an asymmetric-key encryption algorithm. For example, the first algorithm may be an AES algorithm, and the second algorithm may be a SHA algorithm.

According to an embodiment, the first algorithm may be different than the second algorithm that is in the same category as the first algorithm. For example, the first algorithm may be or include an AES algorithm included in the symmetric-key encryption algorithm, and the second algorithm may be or include a DES algorithm included in the symmetric-key encryption algorithm.

Figure 3:
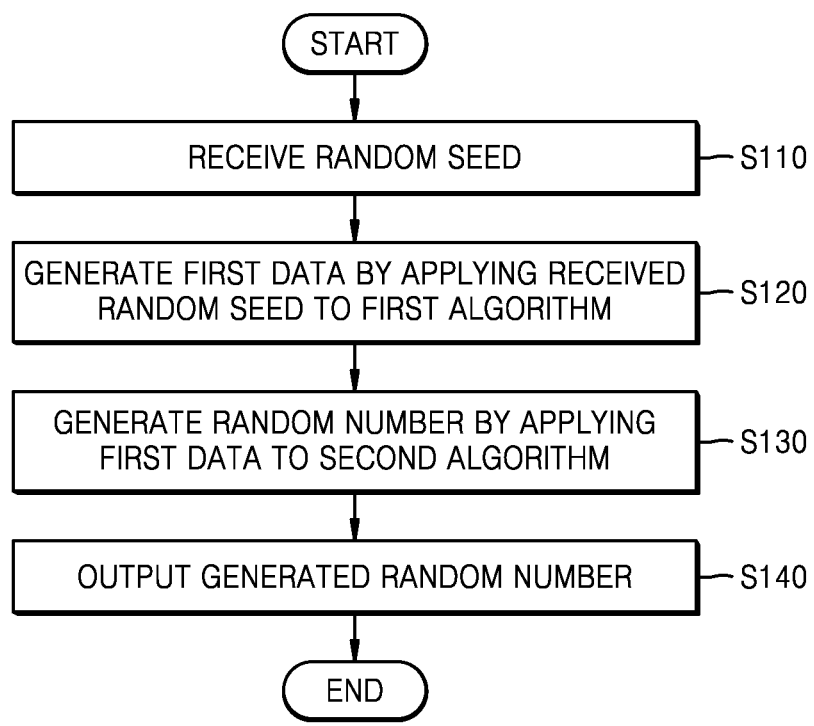
FIG. 3 is a flowchart illustrating an operation of a post processor, according to an embodiment of the present disclosure.

FIG. 3 is a flowchart illustrating an operation of a post processor, according to an embodiment of the present disclosure.

Referring to FIGS. 2 and 3, the post processor 100 may receive the random seed RS from the random seed generator 200, in operation S110, and may generate the first data D1 by applying the received random seed RS to the first algorithm, in operation S120. In operation S130, the post processor 100 may generate the random number RN by applying the first data D1 to the second algorithm. In operation S140, the post processor 100 may output the generated random number RN to the outside.

According to the present disclosure, the first algorithm and the second algorithm may have different bias properties, and accordingly, unbiasedness of the random number RN may increase.

Figure 4:
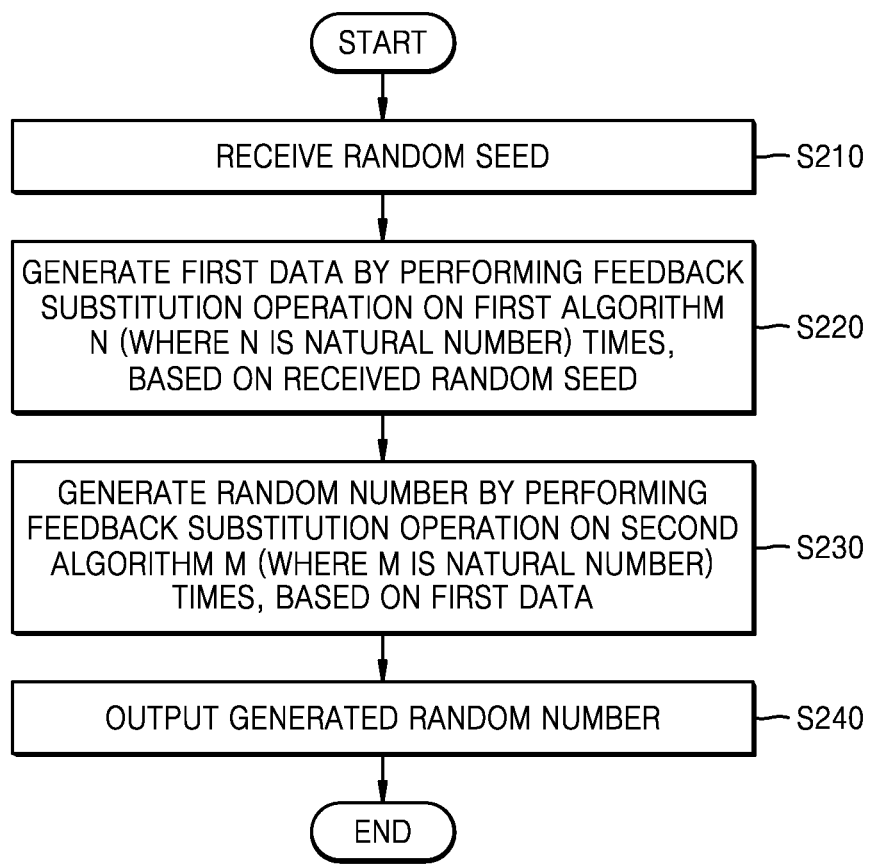
FIG. 4 is a flowchart illustrating an operation of a post processor, according to an embodiment of the present disclosure.

FIG. 4 is a flowchart illustrating an operation of a post processor, according to an embodiment of the present disclosure.

Referring to FIGS. 2 and 4, the post processor 100 may receive the random seed RS from the random seed generator 200, in operation S210, and may generate the first data D1 by performing a feedback substitution operation on the first algorithm N times (where N is a natural number), based on the received random seed RS, in operation S220. Herein, the feedback substitution operation may mean an operation of substituting a resultant value of an algorithm for the algorithm again. For example, when performing the feedback substation operation on the first algorithm twice, based on the random seed RS, the post processor 100 may generate the first data D1 by substituting a result value obtained by substituting the random seed RS for the first algorithm for the first algorithm again. In other words, performing feedback substitution operations N times may mean substituting the random seed RS for the first algorithm and additionally substituting a result value of the previous substitution for the first algorithm again N-1 times.

In operation S230, the post processor 100 may generate the random number RN by performing the feedback substitution operation on the second algorithm M times (where M is a natural number), based on the first data D1. In operation S240, the post processor 100 may output the generated random number RN to the outside.

According to an embodiment of the present disclosure, the post processor 100 may generate the random number RN by performing the feedback substitution operation on only at least some of multiple algorithms, based on the random seed RS. For example, the first algorithm may be an AES algorithm, and the second algorithm may be a SHA-256 algorithm. The post processor 100 may generate the first data D1 by performing the feedback substitution operation on an AES algorithm sixteen times, based on the random seed RS, and may generate the random number RN by substituting the first data for the SHA-256 algorithm once.

As set forth above, M and N are natural numbers. In operation S220, the post processor performs a feedback substitution operation N times on the first algorithm, based on the received random seed RS. In operation S230, the feedback substitution operation is performed on the second algorithm M times, based on the first data D1.

Figure 5:
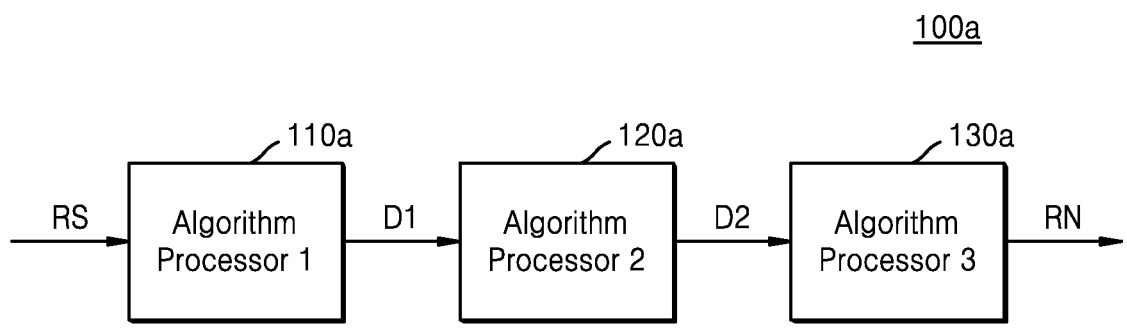
FIG. 5 is a block diagram illustrating a post processor according to an embodiment of the present disclosure.

FIG. 5 is a block diagram illustrating a post processor 100a according to an embodiment of the present disclosure. Thus, a description of the post processor 100a of FIG. 5 that has already been given above with reference to FIG. 2 will be omitted.

Referring to FIG. 5, the post processor 100a may include a first algorithm processor 110a, a second algorithm processor 120a, and a third algorithm processor 130a. The first algorithm processor 110a may generate first data D1 by applying a random seed RS received from a random seed generator to a first algorithm. The second algorithm processor 120a may generate second data D2 by applying the first data D1 received from the first algorithm processor 110a to a second algorithm. The third algorithm processor 130a may generate a random number RN by applying the second data D2 received from the second algorithm processor 120a to a third algorithm.

According to an embodiment of the present disclosure, at least two of the first algorithm, the second algorithm, and the third algorithm may have different bias properties. According to an embodiment, at least two of the first algorithm, the second algorithm, and the third algorithm may be encryption algorithms belonging to different categories. For example, the first algorithm may be an asymmetric-key encryption algorithm, the second algorithm may be a hash function algorithm, and the third algorithm may be a symmetric-key encryption algorithm. According to another embodiment, at least two of the first algorithm, the second algorithm, and the third algorithm may be different encryption algorithms belonging to the same category.

According to an embodiment, at least one of the first algorithm processor 110a, the second algorithm processor 120a, and the third algorithm processor 130a may generate an output value by performing the feedback substitution operation on the same algorithm multiple times, based on an input value, as described above with reference to FIG. 4.

Figure 6:
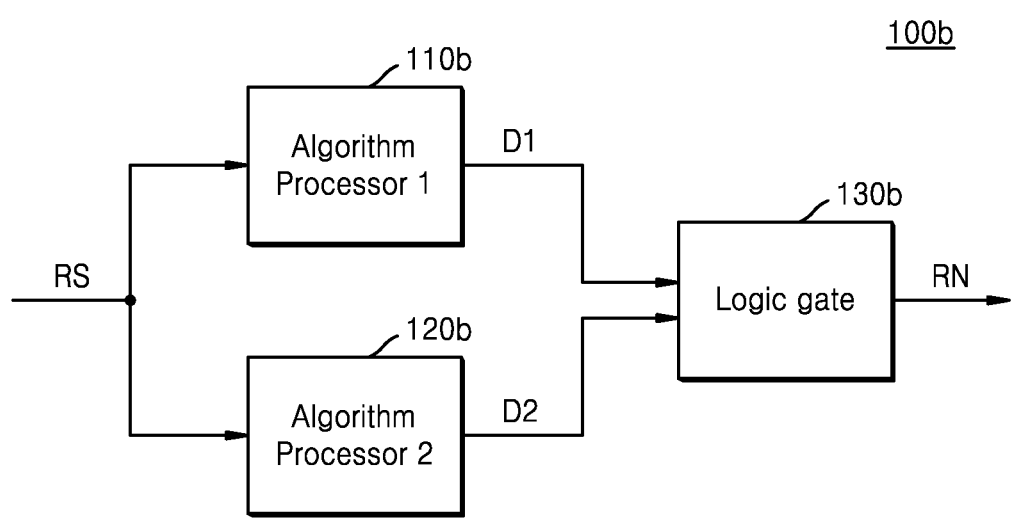
FIG. 6 is a block diagram illustrating a post processor according to an embodiment of the present disclosure.

FIG. 6 is a block diagram illustrating a post processor 100b according to an embodiment of the present disclosure. Thus, a description of the post processor 100b of FIG. 6 that has already been given above with reference to FIG. 2 will be omitted.

Referring to FIG. 6, the post processor 100b may include a first algorithm processor 110b, a second algorithm processor 120b, and a logic gate 130b. The first algorithm processor 110b may receive a random seed RS and may generate first data D1 by applying the received random seed RS to a first algorithm. The second algorithm processor 120b may receive the random seed RS and may generate second data D2 by applying the received random seed RS to a second algorithm. The logic gate 130b may receive the first data D1 and the second data D2 and may generate a random number RN by performing a logic operation on the received first data D1 and the received second data D2. The logic gate 130b may include a gate device, for example, a NAND gate, a NOR gate, an OR gate, an AND gate, or an XOR gate.

According to an embodiment of the present disclosure, the first algorithm and the second algorithm may have different bias properties, and accordingly, the first data D1 and the second data D2 may have different biases. According to an embodiment, the post processor 100b may generate the random number RN via a logic operation on the first data D1 and the second data D2 having different biases, thereby increasing unbiasedness of the random number RN.

According to an embodiment, the first algorithm processor 110b or the second algorithm processor 120b may generate an output value by performing the feedback substitution operation on the same algorithm multiple times, based on an input value, as described above with reference to FIG. 4.

Although an embodiment of generating the random number RN by using two algorithm processors is illustrated in FIG. 6, this is only an embodiment, and the present disclosure is also applicable to an embodiment of generating the random number RN by using two or more algorithm processors.

FIG. 7 is a flowchart illustrating an operation of a post processor, according to an embodiment of the present disclosure.

Referring to FIGS. 6 and 7, the post processor 100b may receive the random seed RS, in operation S310, and may generate the first data D1 by applying the received random seed RS to the first algorithm, in operation S320. In operation S330, the post processor 100b may generate the second data D2 by applying the received random seed RS to the second algorithm that is different from the first algorithm. In operation S340, the post processor 100b may generate the random number RN via a logic operation on the first data D1 and the second data D2. In operation S350, the post processor 100b may output the generated random number RN to the outside.

Figure 8A:
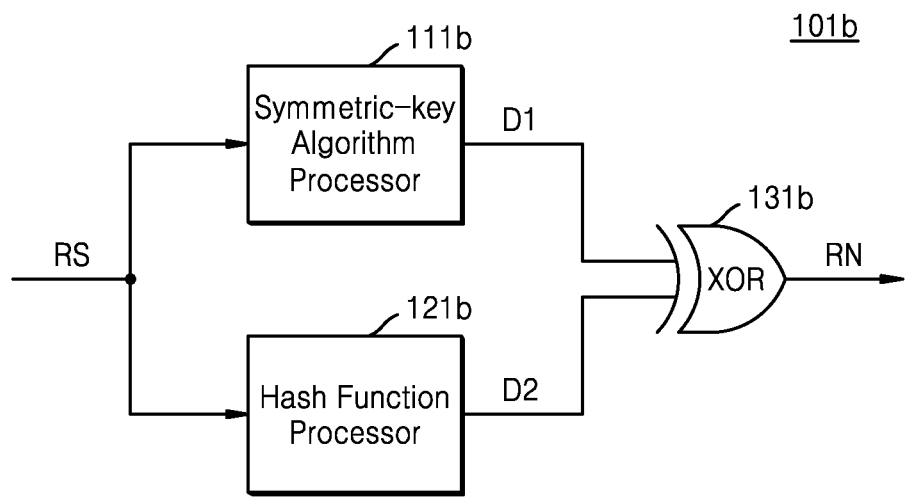
FIG. 8A is a block diagram illustrating a post processor according to an embodiment of the present disclosure.

FIG. 8A is a block diagram illustrating a post processor 101b according to an embodiment of the present disclosure. In detail, FIG. 8A is a block diagram illustrating an example of the post processor 100b of FIG. 6.

Referring to FIG. 8A, the post processor 101b may include a symmetric-key encryption algorithm processor 111b, a hash function algorithm processor 121b, and an XOR gate 131b. The symmetric-key encryption algorithm processor 111b may receive a random seed RS and may generate first data D1 by applying the received random seed RS to a symmetric-key encryption algorithm. According to an embodiment, the symmetric-key encryption algorithm processor 111b may receive a key from an external source and may generate the first data D1 by using the key. The hash function algorithm processor 121b may generate second data D2 by applying the random seed RS to a hash function algorithm. The XOR gate 131b may generate a random number RN via an XOR operation on the first data D1 and the second data D2.

According to an embodiment, the symmetric-key encryption algorithm processor 111b may generate the first data D1 by performing the feedback substitution operation on the symmetric-key encryption algorithm multiple times, based on the received random seed RS.

Figure 8B:
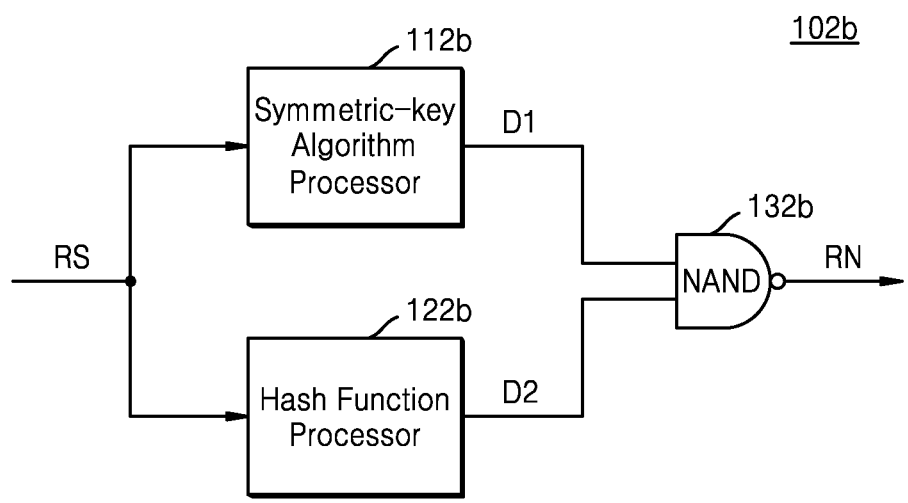
FIG. 8B is a block diagram illustrating a post processor according to an embodiment of the present disclosure.

FIG. 8B is a block diagram illustrating a post processor 102b according to an embodiment of the present disclosure. In detail, FIG. 8B is a block diagram illustrating an example of the post processor 100b of FIG. 6.

Referring to FIG. 8B, the post processor 102b may include a symmetric-key encryption algorithm processor 112b, a hash function algorithm processor 122b, and a NAND gate 132b. The symmetric-key encryption algorithm processor 112b may receive a random seed RS and may generate first data D1 by applying the received random seed RS to a symmetric-key encryption algorithm. According to an embodiment, the symmetric-key encryption algorithm processor 112b may receive a key from an external source and may generate the first data D1 by using the key. The hash function algorithm processor 122b may generate second data D2 by applying the random seed RS to a hash function algorithm. The NAND gate 132b may generate a random number RN via a NAND operation on the first data D1 and the second data D2.

According to an embodiment, the symmetric-key encryption algorithm processor 112b may generate the first data D1 by performing the feedback substitution operation on the symmetric-key encryption algorithm multiple times, based on the received random seed RS.

Figure 9:
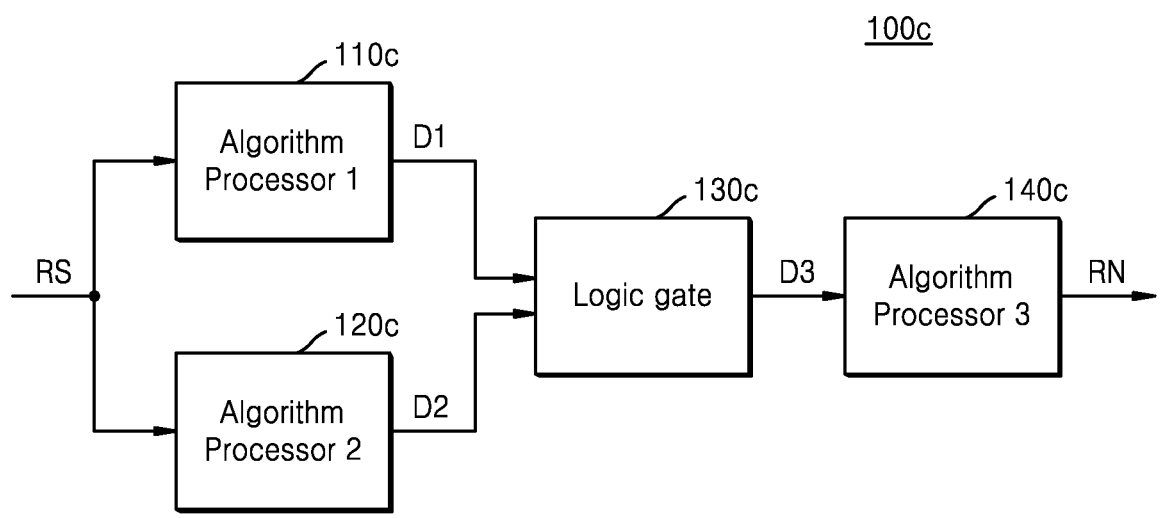
FIG. 9 is a block diagram illustrating a post processor according to an embodiment of the present disclosure.

FIG. 9 is a block diagram illustrating a post processor 100c according to an embodiment of the present disclosure.

Thus, a description of the post processor 100c of FIG. 9 that has already been given above with reference to FIG. 6 will be omitted.

Referring to FIG. 9, the post processor 100c may include a first algorithm processor 110c, a second algorithm processor 120c, a logic gate 130c, and a third algorithm processor 140c. The first algorithm processor 110c may receive a random seed RS and may generate first data D1 by applying the received random seed RS to a first algorithm. The second algorithm processor 120c may receive the random seed RS and may generate second data D2 by applying the received random seed RS to a second algorithm. The logic gate 130c may receive the first data D1 and the second data D2 and may generate third data D3 by performing a logic operation on the received first data D1 and the received second data D2. The third algorithm processor 140c may receive the third data D3 and may generate a random number RN by applying the received third data to a third algorithm. The logic gate 130c may include a gate device, for example, a NAND gate, a NOR gate, an OR gate, an AND gate, or an XOR gate.

According to an embodiment of the present disclosure, at least two of the first algorithm, the second algorithm, and the third algorithm may have different bias properties. According to an embodiment, at least two of the first algorithm, the second algorithm, and the third algorithm may be encryption algorithms belonging to different categories. For example, the first algorithm may be an asymmetric-key encryption algorithm, the second algorithm may be a hash function algorithm, and the third algorithm may be a symmetric-key encryption algorithm. According to another embodiment, at least two of the first algorithm, the second algorithm, and the third algorithm may be different encryption algorithms belonging to the same category.

According to an embodiment, at least one of the first algorithm processor 110c, the second algorithm processor 120c, and the third algorithm processor 140c may generate an output value by performing the feedback substitution operation on the same algorithm multiple times, based on an input value, as described above with reference to FIG. 4.

Figure 10:
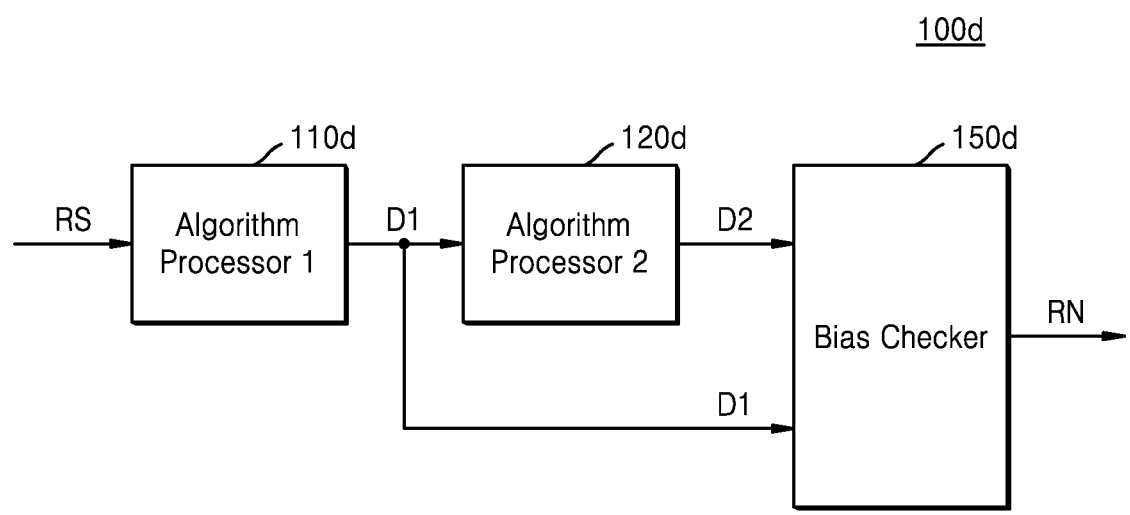
FIG. 10 is a block diagram illustrating a post processor according to an embodiment of the present disclosure.

FIG. 10 is a block diagram illustrating a post processor 100d according to an embodiment of the present disclosure.

Referring to FIG. 10, the post processor 100d may include a first algorithm processor 110d, a second algorithm processor 120d, and a bias checker 150d. The first algorithm processor 110d may generate first data D1 by applying a random seed RS received from a random seed generator to a first algorithm and output the generated first data D1 to the second algorithm processor 120d and the bias checker 150d. The second algorithm processor 120d may generate second data D2 by applying the first data D1 received from the first algorithm processor 110d to a second application and output the generated second data D2 to the bias checker 150d.

According to an embodiment of the present disclosure, the first algorithm and the second algorithm may have different bias properties, and accordingly, the first data D1 and the second data D2 may have different biases. The bias checker 150d may receive the first data D1 and the second data D2 having different biases and may output one of the first data D1 and the second data D2 as a random number RN to the outside according to a predetermined bias evaluation method (for example, a D-monomial test). According to an embodiment, the bias checker 150d may output, as the random number RN, data having higher unbiasedness from among the first data D1 and the second data D2 to the outside.

Figure 11:
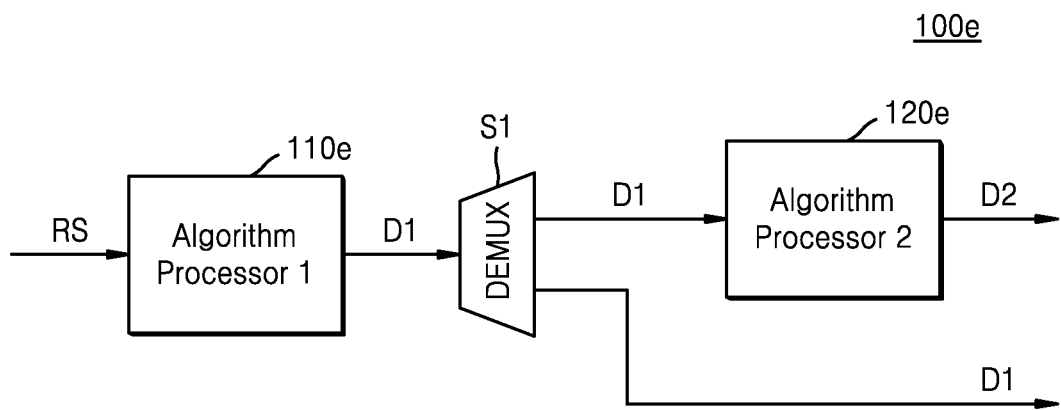
FIG. 11 is a block diagram illustrating a post processor according to an embodiment of the present disclosure.

FIG. 11 is a block diagram illustrating a post processor 100e according to an embodiment of the present disclosure.

Referring to FIG. 11, the post processor 100e may include a first algorithm processor 110e, a second algorithm processor 120e, and a demultiplexer DEMUX. The first algorithm processor 110e may generate first data D1 by applying a random seed RS received from a random seed generator to a first algorithm and output the generated first data D1 to the demultiplexer DEMUX. The demultiplexer DEMUX may output the first data D1 to the second algorithm processor 120e or the outside, based on a selection signal S1 received from an external source (for example, an application processor (AP)). The second algorithm processor 120e may generate second data D2 by applying the received first data D1 to a second algorithm and output the generated second data D2 to the outside.

According to an embodiment, the post processor 100e may output the first data D1 as a random number to the outside, based on the selection signal S1. According to another embodiment, the post processor 100e may output the second data D2 as a random number to the outside, based on the selection signal S1.

Figure 12:
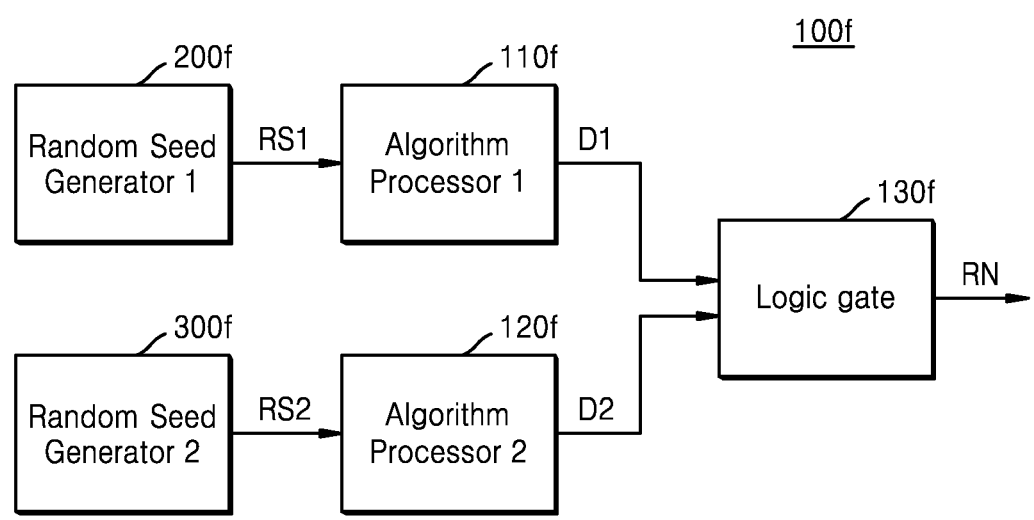
FIG. 12 is a block diagram illustrating a random number generator according to an embodiment of the present disclosure.

FIG. 12 is a block diagram illustrating a random number generator 100f according to an embodiment of the present disclosure. Thus, a description of the random number generator 100f of FIG. 12 that has already been given above with reference to FIG. 1 will be omitted.

Referring to FIG. 12, the random number generator 100f may include a first random seed generator 200f, a second random seed generator 300f, a first algorithm processor 110f, a second algorithm processor 120f, and a logic gate 130f. The first random seed generator 200f may generate a first random seed RS1 of a digital region, based on an entropy signal received from an entropy source. The second random seed generator 300f may generate a second random seed RS2 of the digital region, based on the entropy signal received from the entropy source. The first random seed RS1 and the second random seed RS2 may be generated based on the same entropy signal or different entropy signals, and may be different from each other.

The first algorithm processor 110f may generate first data D1 by applying the first random seed RS1 to a first algorithm. The second algorithm processor 120f may generate second data D2 by applying the second random seed RS2 to a second algorithm. The logic gate 130f may receive the first data D1 and the second data D2 and may generate a random number RN by performing a logic operation on the received first data D1 and the received second data D2. The logic gate 130f may include a gate device, for example, a NAND gate, a NOR gate, an OR gate, an AND gate, or an XOR gate.

FIGS. 13A through 13H are circuit diagrams illustrating entropy sources according to embodiments of the present disclosure.

Figure 13A:
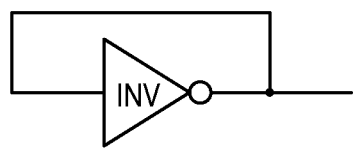
FIGS. 13A through 13H are circuit diagrams illustrating entropy sources according to embodiments of the present disclosure.
Figure 13B:
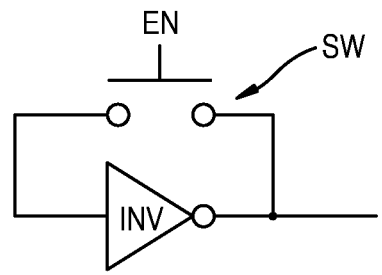

Referring to FIG. 1 and FIGS. 13A-13H, the entropy source 20 may be an inverter INV of which an input terminal and an output terminal are connected to each other as shown in FIG. 13A. According to another embodiment, as shown in FIG. 13B, a switch SW may be connected to an input terminal and an output terminal of an inverter INV. The switch SW may be turned on/off in response to an enable signal EN received from an external source. When the switch SW is turned on, the input terminal and the output terminal of the inverter INV may be connected to each other. In this case, an output voltage of the inverter INV may reach a metastable level and may continuously keep this metastable level. Due to thermal noise, the output voltage of the inverter INV may stochastically fluctuate in the metastable level.

Figure 13C:
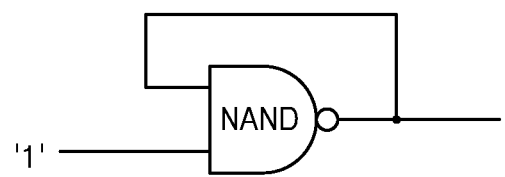
Figure 13D:
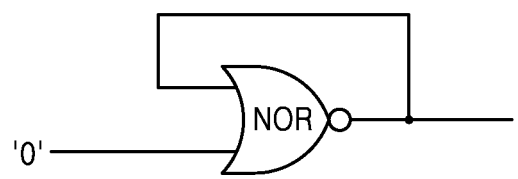

Referring to FIGS. 13C and 13D, the entropy source 20 may be a NAND or NOR gate having an input terminal and an output terminal connected to each other. When an enable signal EN (for example, '1') is input to an input terminal of the NAND gate, because the input terminal and the output terminal of the NAND gate are connected to each other, an output voltage of the NAND gate reaches a metastable level. Similarly, when an enable signal EN (for example, '0') is input to an input terminal of the NOR gate, because the input terminal and the output terminal of the NOR gate are connected to each other, an output voltage of the NOR gate reaches a metastable level.

Figure 13E:
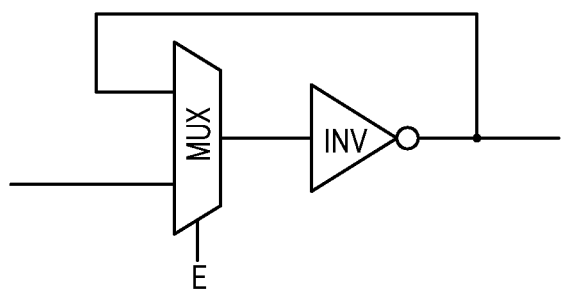

Referring to FIG. 13E, the entropy source 20 may further include a multiplexer MUX in addition to an inverter INV, and an output terminal of the inverter INV may be connected to a first input terminal of the multiplexer MUX. Accordingly, according to a selection signal E applied to the multiplexer MUX, the output terminal of the inverter INV may reach the metastable level, or a signal connected to a second input terminal of the multiplexer MUX may be transmitted to the inverter INV. The inverter INV of FIG. 13E may be implemented using a NAND gate and a NOR gate. In this case, respective input terminals of the NAND gate and the NOR gate may be connected to each other.

Figure 13F:
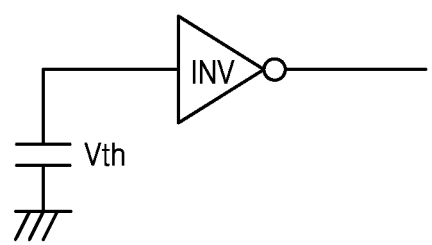
Figure 13G:
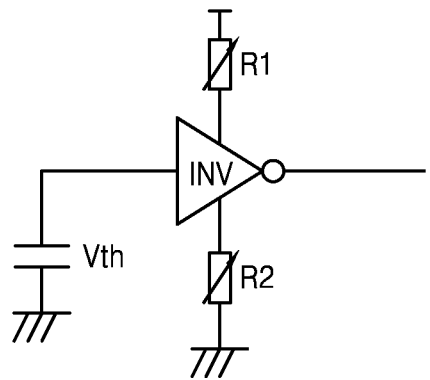
Figure 13H:
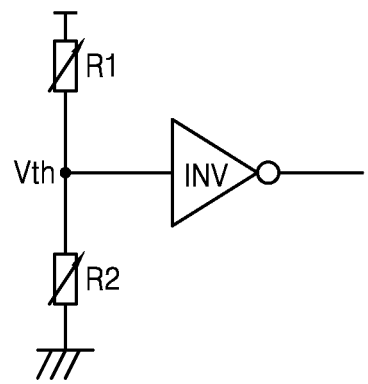

FIG. 13F illustrates a structure in which a threshold voltage Vth is applied to an input terminal of an inverter INV. Due to thermal noise of the threshold voltage Vth, an output voltage of the inverter INV may stochastically fluctuate. FIG. 13G illustrates a structure in which variable resistors are further included in the structure of FIG. 13F and connected to the inverter INV, and threshold voltage characteristics of the inverter INV may be controlled by the variable resistors. FIG. 13H illustrates a structure in which a threshold voltage Vth applied to an inverter INV may be controlled by changing variable resistors.

Figure 14:
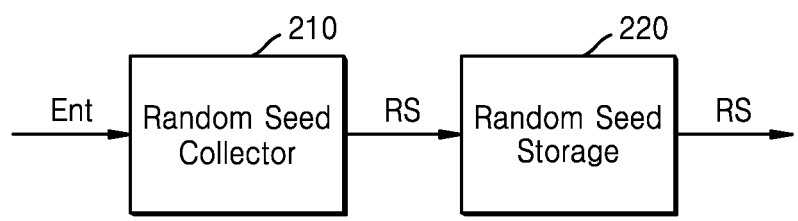
FIG. 14 is a block diagram illustrating a random seed generator included in the security device of FIG. 1, according to an embodiment of the present disclosure.

FIG. 14 is a block diagram illustrating the random seed generator 200 of FIG. 1, according to an embodiment of the present disclosure.

Referring to FIGS. 1 and 14, the random seed generator 200 may include a random seed collector 210 and a random seed storage 220. The random seed collector 210 may generate the random seed RS of the digital region by sampling the entropy signal Ent. The random seed storage 220 may store the random seed RS of the digital region and may output the random seed RS to the post processor 100 in correspondence with a clock signal.

Figure 15A:
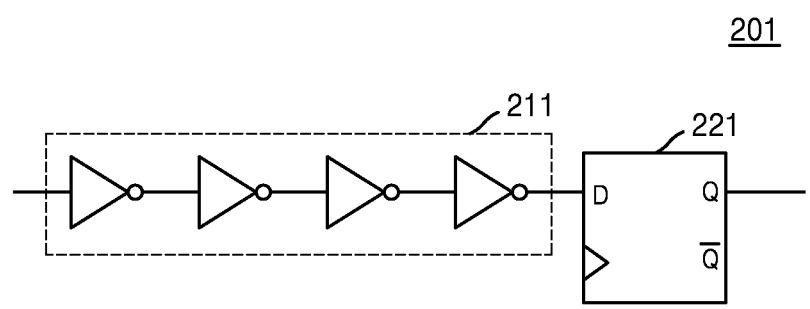
FIGS. 15A and 15B are block diagrams of random seed generators according to embodiments of the present disclosure.
Figure 15B:
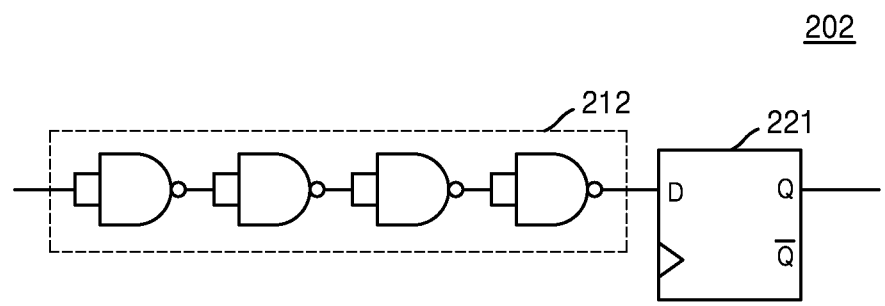

FIGS. 15A and 15B are block diagrams of random seed generators 201 and 202 according to embodiments of the present disclosure. Thus, descriptions of the random seed generators 201 and 202 of FIGS. 15A and 15B that have already been given above with reference to FIG. 14 will be omitted.

Referring to FIGS. 15A and 15B, the random seed generators 201 and 202 may include random seed collectors 211 and 212, respectively, and each may include a random seed storage 221. As shown in FIG. 15A, the random seed collector 211 may include multiple inverters connected to each other in series. As shown in FIG. 15B, the random seed collector 212 may include multiple NAND gates connected to each other in series.

The random seed storage 221 may include a storage element for storing a random seed, for example, a D flip-flop. The random seed storage 221 may output the random seed to a post processor in correspondence with a clock signal.

Figure 16:
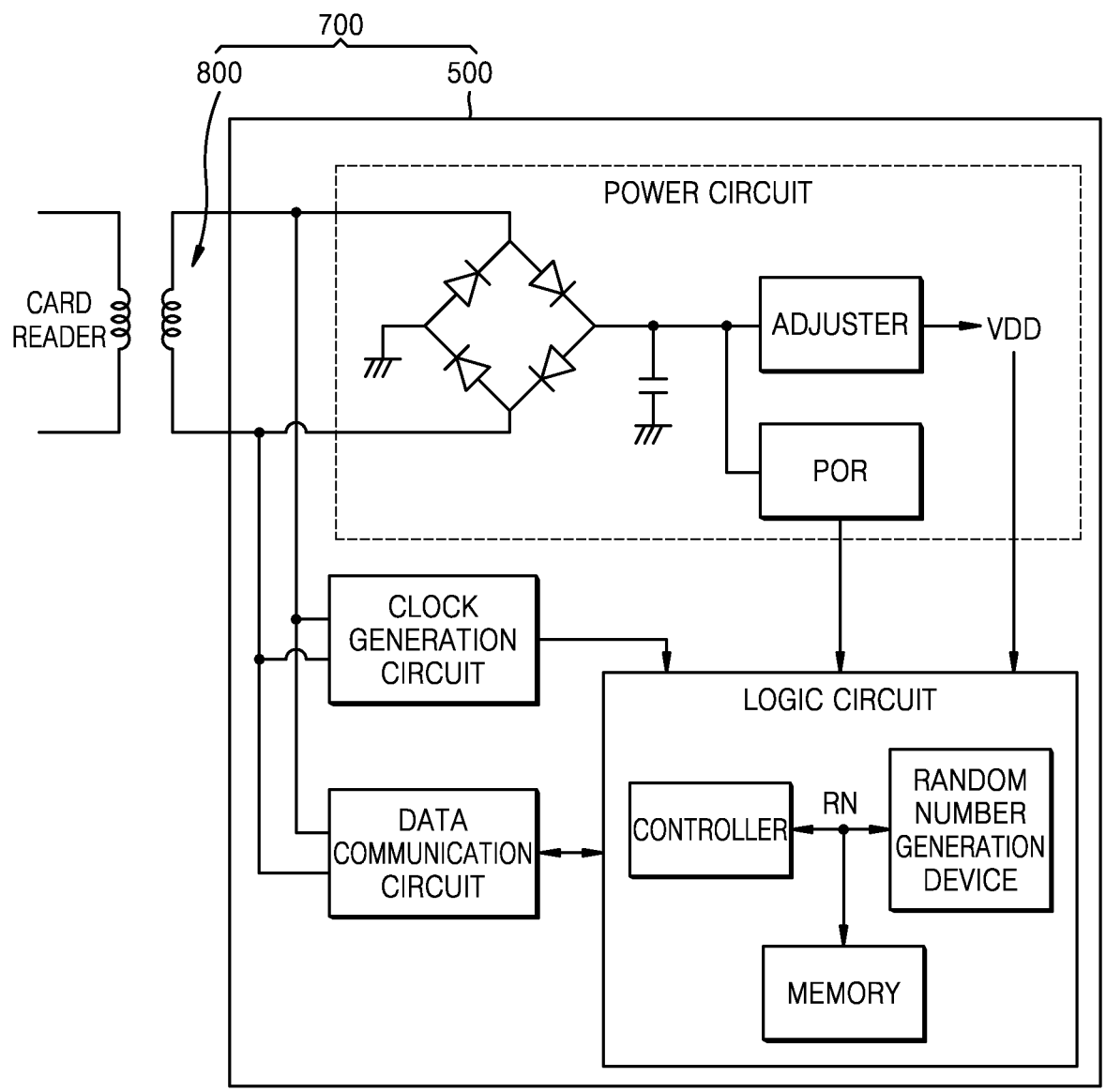
FIG. 16 is a block diagram illustrating a smart card in which a security device has been implemented, according to an embodiment of the present disclosure.

FIG. 16 is a block diagram illustrating a smart card 700 in which a security device has been implemented, according to an embodiment of the present disclosure.

In FIGs. herein including FIG. 16 circuitry may be shown as, for example, a "card reader", an "adjuster", a "controller", a "bias checker", a "random seed generator", a "random seed collector. As is traditional in the field of the inventive concept(s) described herein, examples may be described and illustrated in terms of blocks which carry out a described function or functions. These blocks, which may be referred to herein as a card reader, an adjuster, a controller, a bias checker, a random seed generator, and a random seed collector, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the inventive concepts. Likewise, the blocks of the examples may be physically combined into more complex blocks without departing from the scope of the inventive concepts.

Referring to FIG. 16, the smart card 700 may include the security devices according to the above-described embodiments. Because the smart card 700 basically performs authentication of a card holder, authentication between a card reader (not shown) and the smart card 700 is necessary. This authentication may be performed according to, for example, a method in which the card reader receives authentication information stored in the smart card 700 and checks the legitimacy of the smart card 700. In this case, security maintenance of the authentication information is needed, and thus, an appropriate algorithm for encrypting authentication information and a security device for use in the algorithm need to be implemented.

A semiconductor chip 500 may include security devices according to embodiments of the present disclosure in order to perform the above-described authentication function. In other words, a random number generation device included in the semiconductor chip 500 may generate a random number by using at least two algorithms having different bias properties.

An antenna 800 may perform a function of receiving power from the card reader and transmitting the received power to the semiconductor chip 500, or transmitting encrypted authentication information generated by the semiconductor chip 500.

The semiconductor chip 500 may include a power circuit, a clock generation circuit, a logic circuit, and a data communication circuit. The power circuit may generate direct current (DC) power, based on an alternating current (AC) signal received from the antenna 800. The power circuit may include a power-on reset (POR) circuit that resets pre-stored data as power is applied.

The clock generation circuit may convert the AC signal received from the antenna 800 into a clock signal and may apply the clock signal to the logic circuit. The logic circuit may include a controller, a memory, and a security device. A controller may be or include a processor, and a processor may include an application specific integrated circuit (ASIC). The security device generates a digital random number RN. A configuration of the security device has been illustrated in the above-embodiments, and thus, a detailed description thereof will be omitted. The controller may be configured to encrypt the authentication information, based on the digital random number RN generated by the security device. The memory stores the authentication information, the digital random number RN, and encrypted authentication information.

The data communication circuit may process information received from the card reader and the antenna 800 and transmits the processed information to the logic circuit, or process the encrypted authentication information generated by the logic circuit and transmits the processed encrypted authentication information to the antenna 800 and the card reader.

While the present disclosure has been particularly shown and described with reference to embodiments thereof, it will be understood that various changes in form and details may be made therein without departing from the spirit and scope of the following claims.

What is claimed is:

1. A random number generator, comprising:
   a random seed generator configured to receive an entropy signal and to generate a random seed of a digital region generated by using the entropy signal; and
   a post processor configured to generate first data by applying the random seed to a first algorithm and to generate a random number by applying the first data to a second algorithm,
   wherein a bias property represents unbiasedness of a result value, and a bias property of the first algorithm is different from a bias property of the second algorithm; and
   wherein the post processor generates the first data by performing a feedback substitution operation N times on the first algorithm, based on the random seed, and generates the random number by performing the feedback substitution operation M times on the second algorithm, based on the first data, wherein M and N are natural numbers.

2. The random number generator of claim 1, wherein the first algorithm comprises a symmetric-key encryption algorithm, and the second algorithm comprises a hash function algorithm.

3. The random number generator of claim 2, wherein
   the first algorithm comprises an advanced encryption standard (AES) algorithm, and the second algorithm comprises a secure hash algorithm (SHA) 256, and
   the post processor generates the first data by performing the feedback substitution operation sixteen times on the first algorithm sixteen times, based on the random seed, and generates the random number by performing the feedback substitution operation once on the second algorithm, based on the first data.

4. The random number generator of claim 1, wherein the first algorithm is a hash function algorithm, and the second algorithm comprises a symmetric-key encryption algorithm.

5. The random number generator of claim 1, wherein the post processor generates second data by applying the random seed to the second algorithm, and generates the random number by using the first data and the second data.

6. The random number generator of claim 5, wherein
   the post processor comprises a logic gate configured to generate the random number via a logic operation on the first data and the second data, and
   the logic gate comprises one of an XOR gate, an OR gate, an AND gate, a NOR gate, and a NAND gate.

7. The random number generator of claim 5, wherein
   the post processor generates the second data by performing the feedback substitution operation on the second algorithm M times, based on the random seed, wherein M and N are natural numbers, and
   the first algorithm comprises a symmetric-key encryption algorithm, and the second algorithm comprises a hash function algorithm.

8. The random number generator of claim 1, further comprising:
   a first random seed generator configured to receive a first entropy signal and to generate a first random seed generated by using the first entropy signal; and
   a second random seed generator configured to receive a second entropy signal and generate a second random seed generated by using the second entropy signal,
   wherein the post processor generates first data by applying the first random seed to the first algorithm, generates second data by applying the second random seed to the second algorithm, and generates the random number by using the first data and the second data.

9. The random number generator of claim 1, wherein the post processor is configured to generate second data by applying the first data to the second algorithm, and to generate third data by applying the second data to a third algorithm.

10. The random number generator of claim 1, wherein the random seed generator comprises:
    a random seed collector configured to generate a random seed by sampling an entropy signal received from an entropy source; and
    a random seed storage configured to store the random seed.

11. A security device, comprising:
    an entropy source configured to generate an entropy signal by using randomness;
    a random seed generator configured to receive the entropy signal and to generate a digital random seed generated by using the entropy signal; and
    a post processor comprising a first algorithm processor, a second algorithm processor and a logic gate, wherein the post processor is configured to generate a random number from the digital random seed by using a first algorithm and a second algorithm,
    wherein the first algorithm comprises a symmetric-key encryption algorithm, and the second algorithm comprises a hash function algorithm;
    wherein the first algorithm processor is configured to generate first data by applying the digital random seed to the first algorithm;
    the second algorithm processor is configured to generate second data by applying the digital random seed to the second algorithm; and
    the logic gate is configured to generate the random number by using the first data and the second data.

12. The security device of claim 11, wherein the first algorithm processor is configured to generate the first data by performing a feedback substitution operation N times on the first algorithm, based on the digital random seed, wherein N is a natural number; and the second algorithm processor is configured to generate the random number by performing the feedback substitution operation M times on the second algorithm, based on the first data, wherein M is a natural number.

13. The security device of claim 12, wherein the first algorithm comprises an advanced encryption standard (AES) algorithm, and the second algorithm comprises a secure hash algorithm (SHA) 256, and the first algorithm processor generates the first data by performing the feedback substitution operation sixteen times on the first algorithm, based on the digital random seed, and the second algorithm processor generates the random number by performing the feedback substitution operation on the second algorithm once, based on the first data.

14. A random number generating method performed by a random number generator comprising a random seed generator and a post processor, the random number generating method comprising:

receiving an entropy signal from an entropy source, wherein the receiving is performed by the random seed generator;

generating a random seed of a digital region by using the entropy signal, wherein the generating is performed by the random seed generator; and generating a random number from the random seed by using a first algorithm and a second algorithm, wherein the generating is performed by the post processor, wherein a bias property represents unbiasedness of a result value, and a bias property of the first algorithm is different from a bias property of the second algorithm, and wherein the first algorithm comprises a symmetric-key encryption algorithm, and the second algorithm comprises a hash function algorithm.

15. The random number generating method of claim 14, wherein the generating of the random number comprises:

generating, by the post processor, first data by performing a feedback substitution operation N times on the first algorithm, based on the random seed, wherein N is a natural number; and generating, by the post processor, the random number by performing the feedback substitution operation M times on the second algorithm, based on the first data, wherein M is a natural number.

16. The random number generating method of claim 14, wherein the generating of the random number comprises:

generating first data by applying the random seed to the first algorithm, wherein the generating is performed by the post processor;

generating second data by applying the random seed to the second algorithm, wherein the generating is performed by the post processor; and generating the random number via a logic operation on the first data and the second data, wherein the generating is performed by the post processor.

* * * * *